United States Patent
Hongo

(10) Patent No.: US 10,585,416 B2
(45) Date of Patent: Mar. 10, 2020

(54) ABNORMALITY DIAGNOSTIC METHOD AND ABNORMALITY DIAGNOSTIC DEVICE FOR FEED AXIS

(71) Applicant: OKUMA CORPORATION, Niwa-Gun (JP)

(72) Inventor: Takumi Hongo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 2 days.

(21) Appl. No.: 16/169,201

(22) Filed: Oct. 24, 2018

(65) Prior Publication Data

US 2019/0163164 A1 May 30, 2019

(30) Foreign Application Priority Data

Nov. 24, 2017 (JP) ................. 2017-226065

(51) Int. Cl.
G05B 19/4062 (2006.01)
G05B 19/19 (2006.01)

(52) U.S. Cl.
CPC ......... *G05B 19/4062* (2013.01); *G05B 19/19* (2013.01); *G05B 2219/37002* (2013.01); *G05B 2219/37534* (2013.01)

(58) Field of Classification Search
None
See application file for complete search history.

(56) References Cited

U.S. PATENT DOCUMENTS

2008/0215292 A1 9/2008 Kato et al.

FOREIGN PATENT DOCUMENTS

| JP | 4112594 B2 | 7/2008 |
| JP | 2009-068950 A1 | 4/2009 |

*Primary Examiner* — Carlos R Ortiz Rodriguez
(74) *Attorney, Agent, or Firm* — Burr & Brown, PLLC

(57) ABSTRACT

An abnormality diagnostic method executes causing the feed axis to perform an axis operation in a predetermined diagnosis condition to obtain servo information according to a control of the servomotor, performing a frequency analysis on the obtained servo information, obtaining a damage frequency generated while the feed axis whose bearing is damaged performs the axis operation, from a result of the frequency analysis, and comparing the obtained damage frequency with a predetermined threshold to determine a presence/absence of an abnormality. In the determining, before the damage frequency is compared with the threshold, a determination whether a vibration frequency of the bearing interferes with a vibration frequency generated while a rolling element passes through a nut of the ball screw or not is performed, and the comparison is performed by setting the respective thresholds that are different in a case of the interference and a case of no interference.

3 Claims, 2 Drawing Sheets

ABNORMALITY DIAGNOSTIC METHOD AND ABNORMALITY DIAGNOSTIC DEVICE FOR FEED AXIS

BACKGROUND

This application claims the benefit of Japanese Patent Application Number 2017-226065 filed on Nov. 24, 2017, the entirety of which is incorporated by reference.

TECHNICAL FIELD

The disclosure relates to a method and a device for diagnosing an abnormality of a feed axis in a machine, such as a machine tool including the feed axis with a ball screw.

RELATED ART

In a feed axis of a machine tool, a system where rotational motion of a motor is transmitted to a ball screw for a linear drive is often used. However, in a machine operated for several years, for example, a preload loss by abrasion and a damage due to an entrance of foreign matter, a lubrication failure, or the like occurs, which may cause an accuracy failure and an abnormal noise. In such a state, a trouble of a shape defect, a failure in a pick feed direction, and the like of a workpiece occurs. Accordingly, it is preferred that machine components such as the ball screw, a bearing, and a linear guide that constitute the feed axis be replaced before a deterioration or a damage occurs to cause the trouble.

To confirm a state of the machine component, various diagnostic methods have been proposed, for example, a method that detects and diagnoses vibration of the ball screw, the bearing, and the linear guide by a vibration sensor, and a method that internally disposes a displacement sensor to measure a positioning accuracy. However, adding a sensor near a site desired to be diagnosed may increase a total cost. Further, as the number of parts that possibly break down increases, there is also a problem to lead to increase of a failure risk.

To solve the problem, a method for diagnosing using servo information that is used for control, without using an additional sensor for diagnosis, has been proposed. As one of methods that determine an abnormality of a reducer, Japanese Patent No. 4112594 proposes a method that performs a frequency analysis on an estimated disturbance value and a torque command in the control to compare spectra in the frequency corresponding to integral multiples of a rotation frequency of an axis. JP-A-2009-68950 proposes a method that, in a machine driven by a motor, performs Fourier transformation on a torque command value, obtains and indicates a spectrum, and focuses on the rotational speed while the motor is rotating and a spectrum in a higher mode caused by the rotational speed to confirm a damage of the machine.

Meanwhile, in a machine tool having a feed mechanism in the system where the rotational motion of the motor is transmitted to the ball screw for driving, there are a large number of causes that generate the vibration, such as the ball screw, the bearing, and the linear guide. Thus, determination of an abnormal part by isolating a plurality of elements of vibrations is necessary. It is known that the frequency of the vibration generated in operation of machine components such as the bearing, the ball screw, and the linear guide can be calculated by a geometric formula. A damage site is determined according to the corresponding frequency, magnitudes at integral multiple frequencies of the corresponding frequency, a presence/absence of the peak, and the like.

The following formulas (1) to (7) indicate respective calculating formulas of vibration frequencies of the bearing, the ball screw, and the linear guide.

[Math. 1]

Frequency of Bearing Inner Race Damage:

$$f_{brin} = \frac{Z_{br} \cdot f_r}{2}\left(1 + \frac{d_{br}}{D_{br}}\cos\alpha_{br}\right) \quad \text{Formula (1)}$$

Frequency of Bearing Outer Race Damage:

$$f_{brout} = \frac{Z_{br} \cdot f_r}{2}\left(1 - \frac{b_{br}}{D_{br}}\cos\alpha_{br}\right) \quad \text{Formula (2)}$$

Frequency of Bearing Rolling Element Damage:

$$f_{brball} = \frac{f_r \cdot D_{br}}{2}\left[1 - \left(\frac{d_{br}}{D_{br}}\right)^2\cos^2\alpha_{br}\right] \quad \text{Formula (3)}$$

$f_{brin}$: Frequency of Inner Race Damage [Hz], $f_{brout}$: Frequency of Outer Race Damage [Hz]
$f_{brball}$: Frequency of Rolling Element Damage [Hz]
$D_{br}$: Bearing Pitch Diameter [mm], $d_{br}$: Rolling Element Diameter [mm]
$Z_{br}$: Number of Rolling Elements, $\alpha_{br}$: Contact Angle [deg], $f_r$: Rotational Frequency [Hz]

[Math. 2]

Number of Rolling Elements per Lead of Ball Screw:

$$Z_{bs} = \frac{\pi \cdot D_{bs}}{d_{bs} \cdot \cos\beta_{bs}} \quad \text{Formula (4)}$$

Vibration while Rolling Element Passes through Nut of Ball Screw:

$$f_{bsnut} = \frac{Z_{bs} \cdot f_r}{2}\left(1 - \frac{d_{bs}}{D_{bs}}\cos\alpha_{bs} \cdot \cos\beta_{bs}\right) \quad \text{Formula (5)}$$

Vibration while Rolling Element Passes through Threaded Shaft of Ball Screw:

$$f_{bsscrew} = \frac{Z_{bs} \cdot f_r}{2}\left(1 + \frac{d_{bs}}{D_{bs}}\cos\alpha_{bs} \cdot \cos\beta_{bs}\right) \quad \text{Formula (6)}$$

$Z_{bs}$: Number of Rolling Elements per Lead of Ball Screw
$f_{bsnut}$: Vibration while Rolling Element Passes through Nut of Ball Screw [Hz],
$f_{bsscrew}$: Vibration while Rolling Element Passes through Threaded Shaft of Ball Screw [Hz],
$D_{bs}$: Ball Screw Pitch Diameter [mm], $d_{bs}$: Ball Screw Rolling Element Diameter [mm],
$\alpha_{bs}$: Ball Screw Contact Angle [deg], $\beta_{bs}$: Ball Screw Lead Angle [deg]
Rolling Element Passing Vibration of Linear Guide:

$$f_{lg} = \frac{f_r \cdot l_{bs}}{d_{lg}} \quad \text{Formula (7)}$$

$f_{lg}$: Rolling Element Passing Vibration of Linear Guide [Hz], $l_{bs}$: Lead of Ball Screw [mm], $d_{lg}$: Rolling Element Interval of Linear Guide [mm]

The number of rolling elements per lead of the ball screw calculated in the formula (4) is geometrically calculated. On the other hand, in the actual ball screw, the vibration frequency may be lower than that in the theoretical formula, or possibly does not stabilize according to the position and the time axis, because of a space securing for a circulation passage such as a return tube and load distribution with spacer balls. In the ball screw, since the trajectory of the rolling element is discontinuous, the vibration is often generated while the rolling element passes through the nut of the ball screw even in no-damage state. When servo information is used to diagnose the abnormality in a state where the above mentioned cases are compositely generated, the vibration of the ball screw in the normal state may be misdiagnosed as the vibration of the bearing, in a configuration of the feed axis where the vibration frequency of the bearing is close to the vibration frequency of the ball screw.

Therefore, the disclosure has been made in view of such problems, and an object of the disclosure is to provide a method and device for diagnosing abnormality of a feed axis that can appropriately detect a damage of a bearing, in a configuration of the feed axis where a vibration frequency of the bearing is close to a vibration frequency of a ball screw.

SUMMARY

In order to achieve the above-described object, the present disclosure is a method for diagnosing an abnormality of a feed axis in a machine having the feed axis. The feed axis moves a moving body via a ball screw that is rotated by a servomotor. The method executes causing the feed axis to perform an axis operation in a predetermined diagnosis condition to obtain servo information according to a control of the servomotor, performing a frequency analysis on the obtained servo information, obtaining a damage frequency generated while the feed axis whose bearing is damaged performs the axis operation, from a result of the frequency analysis, and comparing the obtained damage frequency with a predetermined threshold to determine a presence/absence of an abnormality. In the determining, before the damage frequency is compared with the threshold, a determination whether a vibration frequency of the bearing interferes with a vibration frequency generated while a rolling element passes through a nut of the ball screw or not is performed, and the comparison is performed by setting the respective thresholds that are different in a case of the interference and a case of no interference.

DETAILED DESCRIPTION

The following describes embodiments of the disclosure based on the drawings.

Figure 1:
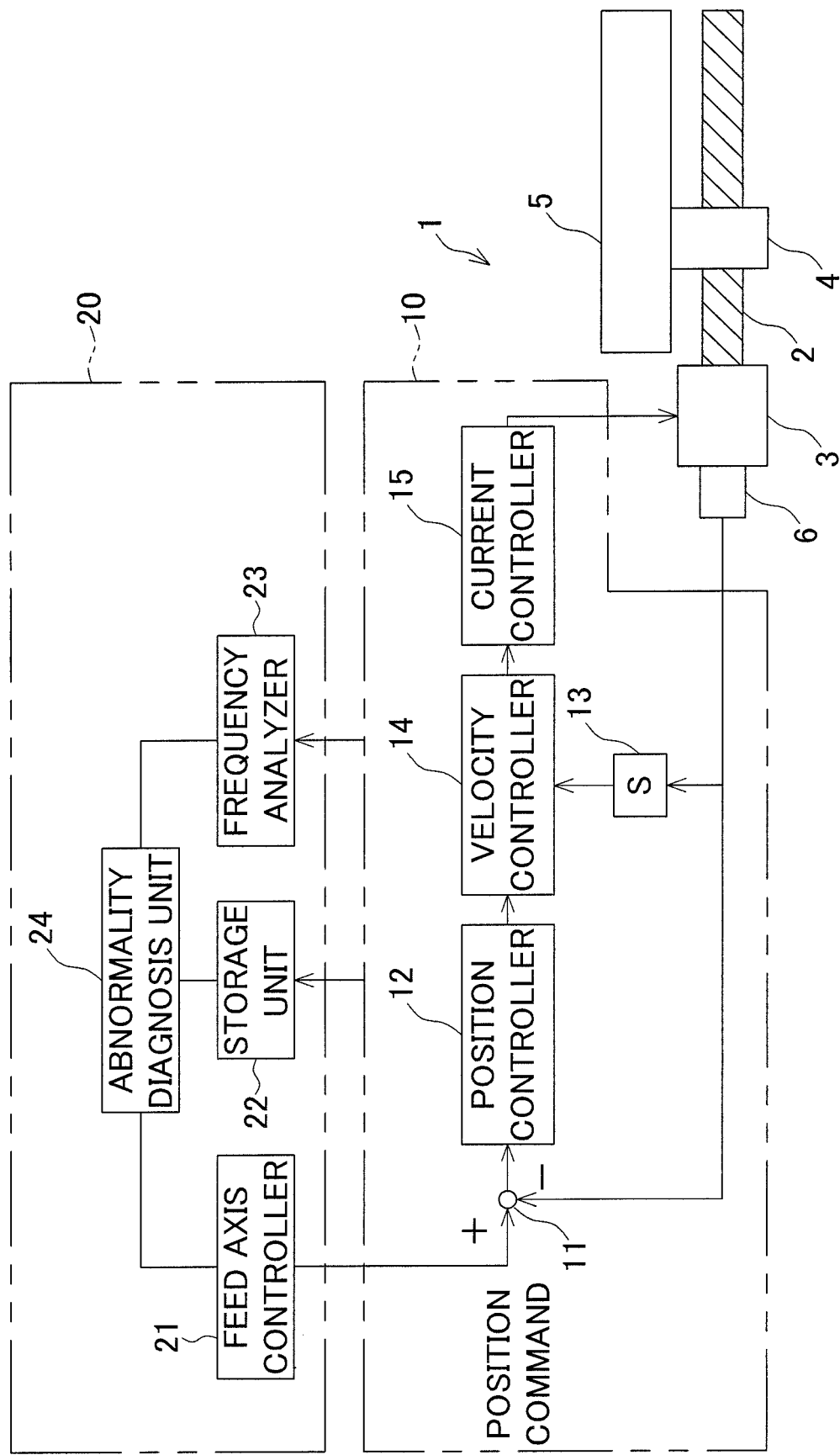
FIG. 1 is a block diagram of a feed axis and a position control device in a machine tool.

FIG. 1 is an exemplary block diagram of a feed axis 1 and a position control device 10 in a machine tool to which the disclosure is applied.

First, the feed axis 1 in the machine tool includes a ball screw 2 and a moving body 5. The ball screw 2 is rotatably driven by a servomotor 3 by receiving a position command from a feed axis controller 21 of a Numerical Controller (NC) device 20. The moving body 5 is screwed with the ball screw 2 via a nut 4 to perform a screw feeding movement to an axial direction by the rotation of the ball screw 2. The ball screw 2 has both ends pivotally supported by bearings (not illustrated). Linear movement of the moving body 5 is guided by a linear guide (not illustrated). On the servomotor 3, a position detector 6 is mounted.

In the position control device 10, the position command output from the feed axis controller 21 of the NC device 20 and a current position from the position detector 6 mounted on the motor 3 are input to an adder 11, and then, a calculated position deviation is input to a position controller 12. The position controller 12 generates a speed command value corresponding to a position error amount to output the speed command value to a velocity controller 14. The velocity controller 14 generates a torque command value corresponding to the input speed command value and a speed detection value obtained by calculating the current position with a differentiator 13 to output the torque command value to a current controller 15. The current controller 15 controls a current in the servomotor 3 based on the input torque command value. Information used in these processes, including the current position detected at the position detector 6, can be recorded at a storage unit 22 of the NC device 20 to be displayed on a monitor (not illustrated).

Figure 2:
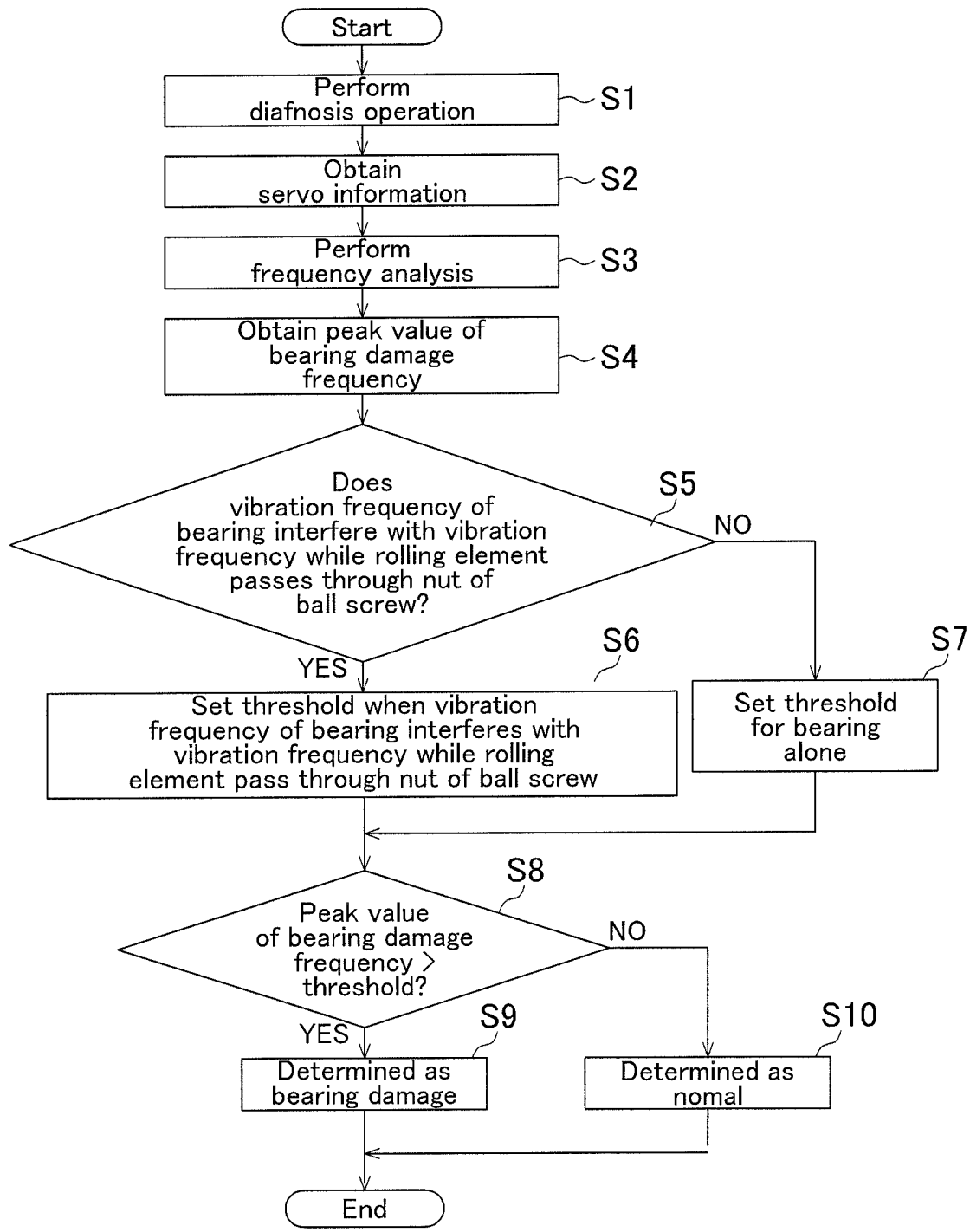
FIG. 2 is a flowchart of an abnormality diagnostic method.

In the NC device 20, a frequency analyzer 23 and an abnormality diagnosis unit 24 are configured in addition to the feed axis controller 21 and the storage unit 22. The frequency analyzer 23 is frequency analyzing means that performs a frequency analysis on servo information according to the control of the servomotor 3 when the feed axis 1 is caused to perform an axis operation (a diagnosis operation) for abnormality diagnosis, which will be described later. The abnormality diagnosis unit 24 obtains a damage frequency generated when the bearing of the ball screw 2 is damaged, from its frequency analysis result, and compares the obtained damage frequency with a predetermined threshold to determine the presence/absence of the abnormality. That is, the NC device 20 has a function as the abnormality diagnosis device of the disclosure as well. Here, the abnormality diagnosis unit 24 functions as servo information obtaining means that obtains the servo information by causing the feed axis to perform the axis operation in a predetermined diagnosis condition via the feed axis controller 21. The abnormality diagnosis unit 24 also functions as damage frequency obtaining means that obtains the damage frequency of the bearing from the frequency analyzer 23, and determining means that determines the presence/absence of the abnormality. The following describes an abnormality diagnostic method by the NC device 20 based on a flowchart in FIG. 2.

First, an appropriate diagnosis operation is performed for the abnormality diagnosis of the feed axis based on the servo information at S1, and the servo information in the operation is obtained at S2 (a servo information obtaining step). The servo information may be recorded in the NC device 20 or recorded by being drawn from the NC device 20 into, for example, an oscilloscope.

Here, in the axis operation at S1, the appropriate diagnosis condition for the abnormality diagnosis of the feed axis 1 based on the servo information indicates an operation in equal to or more than a movement distance that ensures a sampling period required for performing the frequency analysis. The frequency analysis is performed in a frequency characteristic of a servo system of the feed axis 1 that makes the diagnosis, in a feed velocity set such that the vibration frequency of the bearing is in a frequency band whose gain characteristic becomes equal to or more than a certain value.

For example, in the feed axis 1 where the ball screw 2 has a lead of 10 mm, a coefficient of the frequency of a bearing inner race damage with respect to the rotational frequency is 10, and the frequency band whose gain characteristic becomes equal to or more than the certain value is 30 to 200 Hz, the diagnosis operation is set such that the vibration frequency of the bearing becomes 100 Hz. In this case, the rotational frequency becomes 10 Hz, and the feed velocity becomes 6000 mm/min. When the FFT is employed for the frequency analysis and a frequency resolution of about 1 Hz is required, sampling of 1024 points is required if the sampling period to obtain servo information is 1 msec. Further, in the same conditions, in case where each of an acceleration period and deceleration period takes 0.1 sec, 1.224 sec is required as an operation period, that means, the movement distance equal to or more than 122.4 mm is required.

Next, the frequency analysis is performed on the obtained servo information (here, the torque command value is obtained as an example) by the FFT at S3 (a frequency analyzing step), and the peak value of the bearing damage frequency in the frequency analysis result is obtained at S4 (a damage frequency obtaining step).

Then, determination is made whether the vibration frequency of the bearing interferes with the vibration frequency while a rolling element passes through the nut 4 of the ball screw 2 or not at S5. Here, when the vibration frequency of the bearing interferes with the vibration frequency at the nut 4 side, a threshold in which the vibration frequency of the bearing interferes with the vibration frequency at the nut 4 side is set at S6. On the other hand, when the vibration frequency of the bearing does not interfere with the vibration frequency at the nut 4 side, a threshold for the bearing alone is set at S7. These thresholds are each set in the case where the vibration frequency of the bearing interferes with the vibration frequency at the nut 4 side and the case where the vibration frequency of the bearing does not interfere with the vibration frequency at the nut 4 side. These setting are made, for example, by preliminarily calculating the peak value of the bearing damage frequency in the machine tool in a normal state such as in the shipping (in the case of the interference, a threshold that avoids these vibration frequencies is set).

Then, it is determined whether the peak value of the bearing damage frequency exceeds the threshold or not using the threshold set at S6 or S7, at S8. When the bearing damage frequency exceeds the threshold, determination that the bearing damage occurs is made at S9. On the other hand, when the bearing damage frequency is equal to or less than the threshold, determination that the bearing is in a normal state at S10 (a determining step). The determination result is displayed on the monitor.

Here, the determination method whether the vibration frequency of the bearing interferes with the vibration frequency at the nut 4 side or not at S5 will be described.

As described above, since the vibration frequency generated in actual is lower than that in the theoretical formula, the vibration frequency band where the rolling element passes through the nut 4 of the ball screw 2 is set. When the vibration frequency of the bearing is in a range of the vibration frequency band where the rolling element passes through the nut 4 of the ball screw 2, it is determined that the vibration frequency of the bearing interferes with the vibration frequency at the nut 4 side.

The vibration frequency band where the rolling element passes through the nut 4 of the ball screw 2 is, for example, set as follows. The values calculated by the above-described formulas (4) and (5) are set as upper-limit values of the frequency of the vibration at the nut 4 side, and the values calculated by the following formulas (8) and (9) are set as lower-limit values of the frequency of the vibration at the nut 4 side, thereby the vibration frequency band where the rolling element passes through the nut 4 is set. The number of subtraction rolling elements of the number of rolling elements per lead is about one to two in many cases.

[Math. 3]

Number of Rolling Elements per Lead of Ball Screw:

$$Z'_{bs} = \frac{\pi \cdot D_{bs}}{d_{bs} \cdot \cos\beta_{bs}} - z \quad \text{Formula (8)}$$

Vibration while Rolling Element Passes through Nut of Ball Screw:

$$f'_{benut} = \frac{Z_{bs} \cdot f_r}{2}\left(1 + \frac{d_{bs}}{D_{bs}}\cos\alpha_{bs} \cdot \cos\beta_{bs}\right) \quad \text{Formula (9)}$$

z: Number of Subtraction Rolling Elements of Number of Rolling Elements per Lead Here, as an example, the vibration frequency band where the rolling element passes through the nut 4 is set in consideration of the number of subtraction rolling elements of the number of rolling elements per lead, but may be set by multiplying the coefficient by the theoretical formula.

Thus, according to the abnormality diagnostic method and device in the above-described configuration, before the obtained peak value of the bearing damage frequency is compared with the threshold, it is determined whether the vibration frequency of the bearing interferes with the vibration frequency at the nut 4 side or not. The comparison is performed by setting the respective thresholds that are different in the case of the interference and the case of no interference. Thus, when the abnormality diagnosis is performed using the servo information, even in the configuration of the feed axis 1 where the vibration frequency of the bearing is close to the vibration frequency of the ball screw 2, the risk that the vibration of the ball screw 2 in the normal state is misdiagnosed as the vibration of the bearing is reduced. Accordingly, the damage of the bearing can be appropriately detected.

In the above-described embodiment, the abnormality diagnostic device is formed in the machine tool to perform the abnormality diagnosis. However, the abnormality diagnosis may be performed such that the frequency characteristic of the feed axis and the damage frequency are stored in an external device such as an outside PC. In such case, the servo information during the axis operation is transmitted to the external device by wire or without wires, and the frequency analysis is performed in the external device. That is, the abnormality diagnostic device and method in the disclosure can be performed including the machine tool having the feed axis as the diagnostic target and the external device. Thus, when the abnormality diagnosis is performed by constituting the abnormality diagnostic device using the external device, there are advantages that the abnormality diagnoses for a plurality of machine tools can be simultaneously performed, and diagnosis data can be also centrally controlled.

Then, the disclosure is applicable to machines insofar as they include the feed axis, not limited to the machine tool.

According to a second aspect of the disclosure, which is in the first aspect of the embodiment, in the determining step, the vibration frequency at the nut side is set as a band, and the respective thresholds that are different while the vibration frequency of the bearing is in the band of the vibration frequency at the nut side and while the vibration frequency of the bearing is out of the band are set.

According to a third aspect of the disclosure, an abnormality diagnostic device diagnoses an abnormality of a feed axis in a machine having the feed axis. The feed axis moves a moving body via a ball screw that is rotated by a servomotor. The device includes servo information obtaining means that causes the feed axis to perform an axis operation in a predetermined diagnosis condition to obtain servo information according to a control of the servomotor, frequency analyzing means that performs a frequency analysis on the obtained servo information, damage frequency obtaining means that obtains a damage frequency generated while the feed axis whose bearing is damaged performs the axis operation, from a result of the frequency analysis, and determining means that compares the obtained damage frequency with a predetermined threshold to determine a presence/absence of an abnormality. In the determining means, before the damage frequency is compared with the threshold, a determination whether a vibration frequency of the bearing interferes with a vibration frequency generated while a rolling element passes through a nut of the ball screw or not is performed, and the comparison is performed by setting the respective thresholds that are different in a case of the interference and a case of no interference.

According to the disclosure, before the obtained damage frequency is compared with the threshold, the determination whether the vibration frequency of the bearing interferes with the vibration frequency generated while the rolling element passes through the nut of the ball screw or not is performed. Then, the comparison is performed by setting respective thresholds that are different in the case of interference and the case of no interference. Thus, in the case where the abnormality diagnosis is performed using the servo information, even in the configuration of the feed axis where the vibration frequency of the bearing is close to the vibration frequency of the ball screw, the possibility that the vibration of the ball screw in the normal state is misdiagnosed as the vibration of the bearing is reduced. Accordingly, the damage of the bearing can be appropriately detected.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An abnormality diagnostic method for diagnosing an abnormality of a feed axis in a machine having the feed axis, the feed axis moving a moving body via a ball screw that is rotated by a servomotor, the method executing:
   causing the feed axis to perform an axis operation in a predetermined diagnosis condition to obtain servo information according to a control of the servomotor;
   performing a frequency analysis on the obtained servo information;
   obtaining a damage frequency generated while the feed axis whose bearing is damaged performs the axis operation, from a result of the frequency analysis; and
   comparing the obtained damage frequency with a predetermined threshold to determine whether or not an abnormality exists, wherein
   in the determining, before the damage frequency is compared with the threshold, a determination whether a vibration frequency of the bearing interferes with a vibration frequency generated while a rolling element passes through a nut of the ball screw or not is performed, and the comparison is performed by setting the respective thresholds that are different in a case of the interference and a case of no interference.

2. The abnormality diagnostic method for the feed axis according to claim 1, wherein
   in the determining, the vibration frequency at the nut side is set as a band, and the respective thresholds that are different while the vibration frequency of the bearing is in the band of the vibration frequency at the nut side and while the vibration frequency of the bearing is out of the band are set.

3. An abnormality diagnostic device for diagnosing an abnormality of a feed axis in a machine having the feed axis, the feed axis moving a moving body via a ball screw that is rotated by a servomotor, the device comprising:
   a servo information obtaining unit that causes the feed axis to perform an axis operation in a predetermined diagnosis condition to obtain servo information according to a control of the servomotor;
   a frequency analyzing unit that performs a frequency analysis on the obtained servo information;
   a damage frequency obtaining unit that obtains a damage frequency generated while the feed axis whose bearing is damaged performs the axis operation, from a result of the frequency analysis; and
   a determining unit that compares the obtained damage frequency with a predetermined threshold to determine a presence/absence of an abnormality, wherein
   in the determining unit, before the damage frequency is compared with the threshold, a determination whether a vibration frequency of the bearing interferes with a vibration frequency generated while a rolling element passes through a nut of the ball screw or not is performed, and the comparison is performed by setting the respective thresholds that are different in a case of the interference and a case of no interference.

* * * * *